Aug. 17, 1937.    J. E. PADGETT    2,090,265
AUTOMATIC CLUTCH
Filed Sept. 26, 1933    2 Sheets-Sheet 1

Inventor
Joseph E. Padgett
Strauch & Hoffman
Attorneys

Aug. 17, 1937.  J. E. PADGETT  2,090,265
AUTOMATIC CLUTCH
Filed Sept. 26, 1933  2 Sheets-Sheet 2

Inventor
Joseph E. Padgett
By Strauch & Hoffman
Attorneys

Patented Aug. 17, 1937

2,090,265

UNITED STATES PATENT OFFICE 2,090,265

AUTOMATIC CLUTCH

Joseph E. Padgett, Toledo, Ohio, assignor to Automatic Drive & Transmission Company, Gloucester City, N. J., a corporation of New Jersey Application September 26, 1933, Serial No. 691,065

5 Claims. (Cl. 192—69)

The present invention relates to mechanisms for automatically transmitting power from a driving shaft to a driven shaft when the respective speeds of the shafts are properly correlated for efficient operation.

More particularly, the present invention relates to automatic clutch mechanisms, and although they possess operating characteristics and structural features that render them especially useful in automotive or like drives, they may be employed in a wide variety of power transmitting drives. The present invention also embodies many features that may be advantageously employed in manually operable clutch mechanisms and therefore the following description and claims are intended to embrace manual as well as automatic clutch mechanisms.

The use of friction clutches in the drive mechanisms of motor vehicles is universal, and in fact many of them are of the single plate type, i. e., friction clutches wherein a driven disc or plate is disposed between, and frictionally cooperates with a pair of driving members. These clutches have proved to be fairly efficient and durable in practice, and in view of their wide-spread adoption, they undoubtedly represent a great improvement over the friction clutches that existed before their development.

Heretofore, when it has been desired to increase the torque handling ability of such clutches, the plate or disc diameter has been increased so as to increase the frictional engaging area thereof, or the driving pressure applied to the plates has been increased, and in some instances both of these expedients have been resorted to with this end in view. Both of these methods of increasing the capacity of such clutches have their disadvantages however, as increasing the diameter of the plates necessitates a corresponding increase in the overall dimensions of such clutches, with the result that they are rendered bulky, and in some instances the limited space available in the drive involved has prohibited their use in such drives. Increasing the driving pressures also is distinctly a disadvantage because it materially increases the pedal pressure required to declutch such mechanisms.

It has also been proposed to provide friction clutches with a plurality of driving and driven plates, to thereby increase the frictional engaging area of such clutches and correspondingly increase their capacity, but such clutches have not proven to be entirely satisfactory in practice, for the reason that they are expensive to produce; they are constructed of a multiplicity of parts which are not interchangeable, thus rendering servicing thereof difficult; they require extensive modification of the drive mechanism in which they are being installed, especially when they are replacing a single plate or disc clutch; and the plates or discs thereof do not promptly free themselves when driving pressure is relieved, with the result that the clutch "drags" and the driven shaft continues to be driven after the clutch has been released.

The present invention is particularly concerned with the production of friction clutches of the multiple plate or disc type which are free from the objectionable features above described.

It is accordingly a primary object of the present invention to devise multiple plate clutches which are durable and highly efficient in practice; and yet which may be produced by low cost, quantity production methods.

It is another major object of my invention to devise multiple plate clutches which will smoothly establish driving connection between driving and driven shafts when their plates are forced together, and which will completely disengage or release the plates when the driving pressure is withdrawn.

Another important object of my invention is to devise, for use in friction clutch mechanisms, a novel pressure applying and frictional unit, which may be secured to a flywheel or like driving member to constitute a single plate clutch, and which may be secured to a spacing member carried by a flywheel or like driving member to form a multiple plate clutch.

A further object of the present invention is to devise single plate and multiple plate clutches in which the majority of their basic structural elements are identical in shape and size, thereby providing clutches whose parts are readily interchangeable.

My invention further aims to devise a novel friction clutch unit, having a frictional member and speed responsive means for applying clutch engaging pressures thereto in response to rotation thereof, which may be secured to different types of supporting rotatable members to thereby form a single plate automatic clutch, or a multiple plate automatic clutch, depending upon the character of the support.

A still further object of the present invention is to devise a power transmitting mechanism, having two major elements, which constitute a friction clutch and which are so designed that they may be modified to form either a single plate clutch or a multiple plate clutch.

My invention further aims to design multiple plate clutches so that the heat generated therein through slippage of the plates may be rapidly dissipated through radiation and convection.

Further objects of the present invention will become apparent as the specification proceeds in connection with the annexed drawings, and from the appended claims.

Referring to the drawings, wherein like reference characters refer to like parts throughout the several views thereof, my automatic clutch mechanism is preferably enclosed in a clutch housing that is illustrated as broken away for the most part, and it is designated by the reference character 1.

A driving shaft 3 is adapted to have rotational efforts applied to it by a suitable prime mover in any desired manner, and may constitute the crank shaft of an internal combustion engine. The end of shaft 3 is secured to a flywheel 4 by bolts 5, or in any other suitable manner. Bolts 5 extend through aligned apertures in the flywheel and a flange provided on the end of shaft 3, and have nuts turned thereon.

Shaft 3 is further provided with a bore 6 in which is carried a bearing assembly 7 for supporting the reduced end 8 of a clutch shaft 9. The rear end of shaft 9 is adapted to be journalled in a bearing assembly (not shown) that is preferably located in recess 10 in housing 1.

A hub 11 is splined upon shaft 9 and is provided with a flange 12. Operatively secured to flange 12, by means of rivets or the like, is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disk 14 near its periphery, and they may consist of any material that has the required characteristics to give the correct frictional gripping force, and at the same time has wearing qualities adapting it for this purpose. I prefer, however, to use the types of material which in practice have given very satisfactory results in automatic slipping drive and clutch mechanisms of the "Powerflo" type. Frictional facings 15 and 16 may be secured to disk 14 in any suitable manner, as for instance by rivets or the like, and they, along with disk 14, will be hereinafter referred to as the driven member. Facings may be annular disks, or they may be formed as segments and secured to disk 14 in circularly spaced relation, in order to provide a flow of cooling air currents if desired.

Facing 15, secured to disk 14, cooperates with the flat driving face of flywheel 4 and is adapted to be frictionally driven thereby. Facing 16, cooperates with a plate 17, which will be hereinafter termed the intermediate plate, and it is adapted to engage and clamp the driven member between it and the flat face of the flywheel. Plate 17 is of substantial thickness so that it may possess a sufficient degree of rigidity to prevent undesirable distortion and warpage thereof under the pressures and temperatures that it is subjected to during operation of the mechanism.

Intermediate plate 17 is driven by the flywheel through the intermediary of driving lugs 18, which are preferably three in number and are integrally formed with plate 17. Lugs 18 are disposed in sliding engagement with the walls of recesses 19 which are formed in rim portion 21 of flywheel 4. Each lug 18 is provided with a recess 22 into which is frictionally fitted a sleeve 23. Comparatively light compression springs 24 are disposed in sleeves 23 and act against the flywheel so as to force plate 17 away therefrom. Although I prefer to associate springs 24 with lugs 18, it is to be understood that they may be located in any other suitable position without departing from the spirit of the present invention.

Movement of plate 17 away from the flywheel is limited by engagement of boss portions 25, formed on lugs 18 thereof, with a cover member 26.

Cover member 26 is secured to the flywheel rim portion 21 by means of cap screws 27, and it is provided with embossed portions 28 in the regions of cap screws 27, for the purpose of spacing the cover from the flywheel rim for a purpose that will presently appear.

Cooperating with plate 17, and with an automatic plate 29, is a second driven member, comprising a hub 31; a vibration dampener 32 and a driven disc 33, carrying facings 34 and 35. Secured to the inner walls of cover 26, by means of a spot welding operation or the like, are three symmetrically arranged lug or key members 36. Key members 36 are received in, and cooperate with the walls of recesses 37 formed in automatic plate 29 to establish a driving connection between flywheel 4 and the automatic plate.

Figures 1, 3, 4, 7:
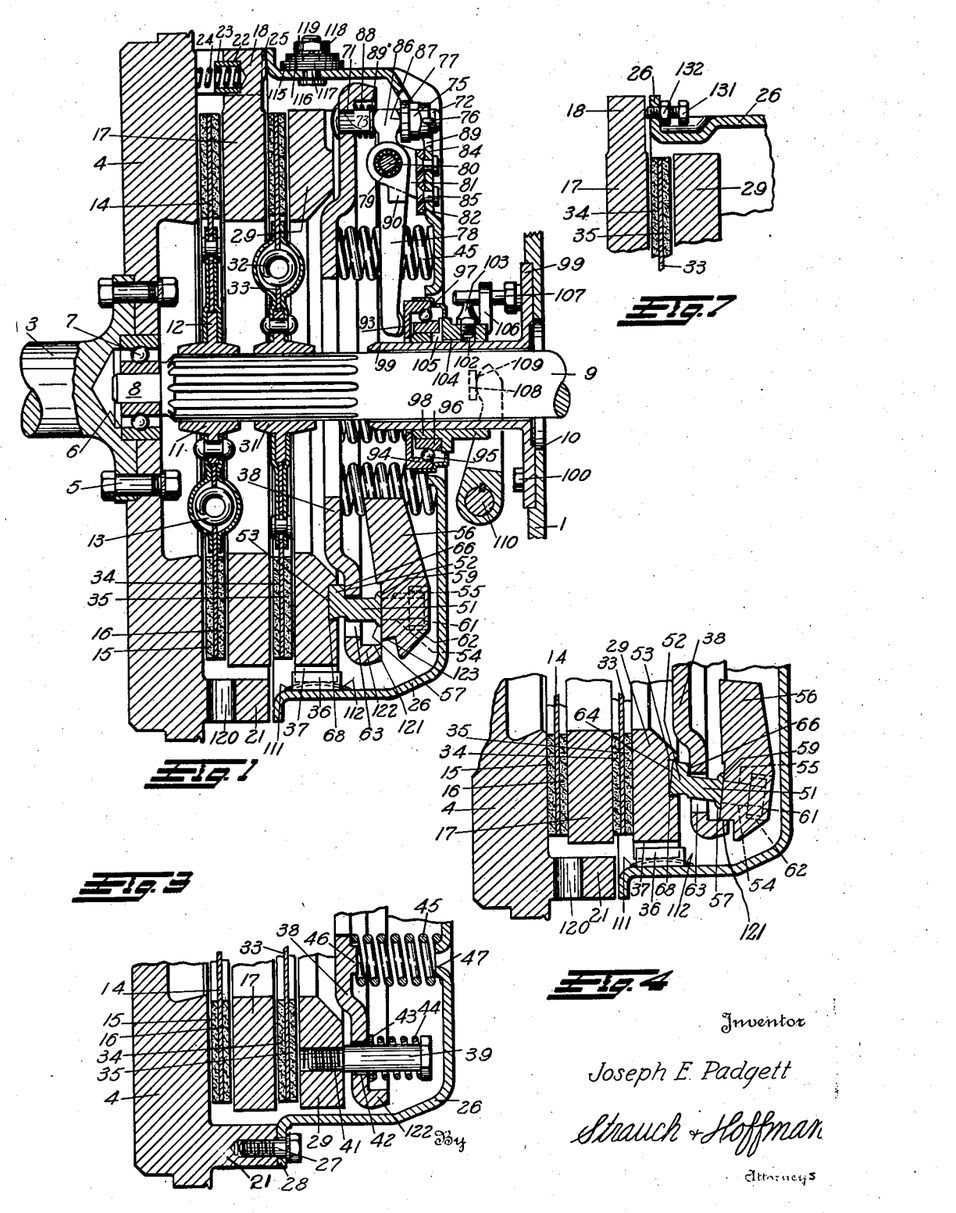
Figure 1 is a longitudinal sectional view of a clutch mechanism forming part of my invention.
Figure 3 is a fragmental sectional view of the clutch mechanism shown in Figure 1 and it illustrates the manner of mounting the hold-back and driving pressure springs in the mechanism.
Figure 4 is a fragmental sectional view of the clutch shown in Figure 1 and it illustrates one of the automatic weights disposed in its engaging or outermost position, and the plates automatically engaged.
Figure 7 is a fragmental sectional view of the clutch shown in Figure 1 and it illustrates an adjusting mechanism associated with the intermediate plate.
Figure 2:
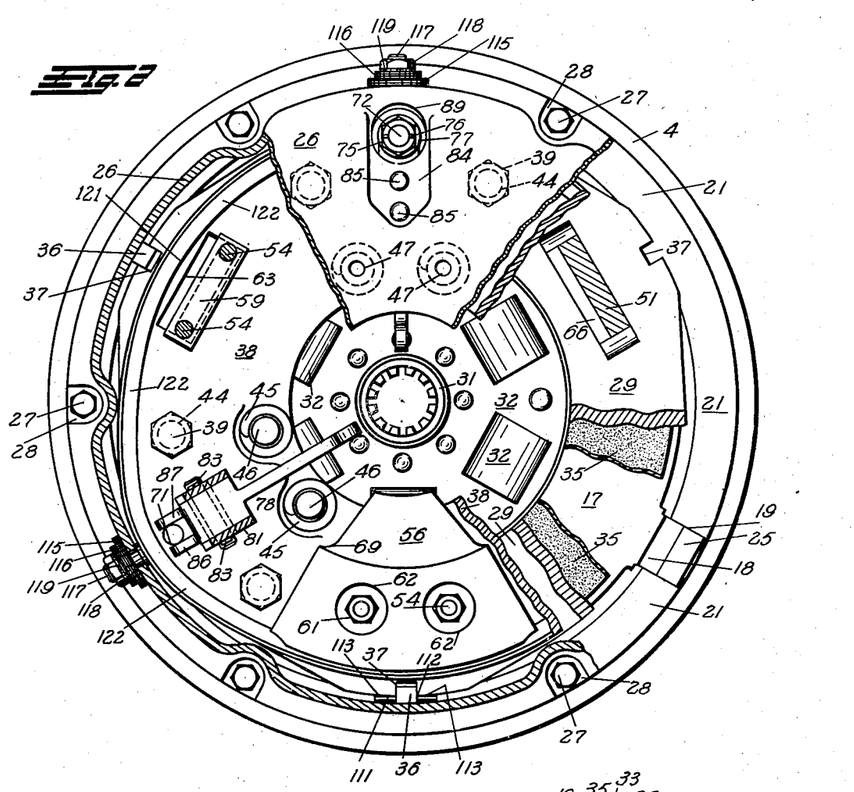
Figure 2 is a view of the clutch shown in Figure 1 as it appears when viewed from the right-hand side of that figure with the throwout mechanism removed and with certain parts in section to more clearly illustrate the structure involved.

Disposed parallel to plate 29 is a plate 38, and it will be hereinafter referred to as a reaction plate, because it takes the reaction of the speed responsive mechanism in a manner to be presently described. Reaction plate 38 is driven by automatic plate 29 through the medium of a plurality of cap screws 39. Referring particularly to Figure 3, each cap screw 39 is provided with a reduced end 41 that is threaded into automatic plate 29, and the thread employed is preferably of the Dardelet or other self-locking type so as to prevent the cap screws from working loose in operation. Cap screws 39 extend through, and lie in slidable driving engagement with the walls of recesses 42 formed in reaction plate 38, and are encircled by washers 43 and compression springs 44. Springs 44 act against the heads of screws 39 and react against plate 38, to thereby urge the automatic and reaction plates toward each other at all times, and they will be hereinafter referred to as holdback springs. The holdback spring assemblies are preferably symmetrically disposed in pairs about the periphery of the plates and in the present instance six are employed, but it is to be understood that more or less than six properly designed holdback spring assemblies may be used if desired without in any way departing from the spirit of my invention. The hold-back assemblies accordingly establish a driving connection between the automatic and reaction plates, and, at the same time, resiliently urge the latter toward each other.

Reaction plate 38 is normally urged toward the flywheel by a plurality of compression springs 45, which are retained in position against plate 38 by means of bosses 46 formed on the latter. Springs 45 react against the surface of cover 26, and are centered thereon by means of pressed out portions 47 formed in cover 26. Springs 45 are preferably six in number and are disposed in substantially common radii with the holdback assemblies. Reaction plate 38, however, is normally held in the position shown in Figure 1, when the driving shaft is operating at or below the idling speed of the engine or other prime mover, by means of a throwout mechanism that will presently be described.

Before proceeding to the description of the actuating mechanism for the automatic plate, it should be understood, that although I have illustrated the surfaces that engage facings 15 and 16 as plane in configuration, they may be grooved in the manner shown in my copending application Serial No. 669,766, if desired.

The automatic and reaction plates may be actuated away from each other by any suitable speed-responsive mechanism, to produce clutch engagement, but in the present embodiment of my invention, it preferably takes the form of a centrifugally operable mechanism. Preferably three weight levers 51, having integrally formed heads 52, are symmetrically arranged between the pairs of pressure springs 45, and have their heads 52 received in rectangular recesses 53 formed in automatic plate 29.

Each lever 51 is provided with a pair of threaded portions 54, which are received in a pair of apertures 55 located in a weight element 56. A reinforcing portion 57 is preferably formed on each lever 51, and is provided with a flat surface 59 that is adapted to abut the surface of weight 56. Weights 56 are held in place on levers 51 by means of nuts 61, turned on portions 54, and seating in countersinks 62 formed in weights 56.

Levers 51 are of substantial width and extend through recesses 63 formed in reaction plate 38. Heads 52 are provided with flat faces 64 that normally abut the bottoms of recesses 53 when the driving shaft is operating at, or below idling speed, and by the term "idling speed", I mean the particular desired automatic uncoupling or disengaging speed of the driven shaft, and if an internal combustion engine is employed as the prime mover, the idling speed will lie in the neighborhood of four hundred to five hundred revolutions per minute.

Heads 52 are also provided with reaction faces 66 which abut the face of reaction plate 38 at all times, and are designed for fulcrumming engagement therewith during operation of the weights. The surface of plate 38 that cooperates with faces 66 of weight-heads 52 may, if desired, be ground and polished so that relative sliding movement thereof may occur with a minimum of friction.

Heads 52 have their outer sides relieved to provide knife-like edges 68 which are adapted to rock or pivot in the dihedral angles defined by the bottom and outer faces of recesses 53 formed in automatic plate 29. The relieving operation enables a good knife edge 68 to be formed on each weight head, and allows pivotal movement thereof without interference from the outer side walls of recesses 53. However, it is to be understood that unrelieved weights may be employed in recesses that are suitably designed so as to have relieved outer side walls, if desired. It is also to be understood that, instead of providing individual recesses 53 for cooperation with the weight heads, a single annular groove, as shown in my co-pending application, Serial No. 660,179, filed March 9, 1933, may be formed in automatic plate 29 if desired, without departing from the spirit of the present invention.

Recesses 53 are formed in automatic plate 29 in any desired manner, as for instance by a milling cutter or the like, and weight heads 52 are prevented from moving longitudinally within the recesses so formed, by the engagement of the walls of recesses 63 formed in plate 38, with the sides of levers 51. Heads 52 fit rather snugly between the inner and outer side walls of recesses 53 so that they are restrained from shifting bodily inwardly or outwardly, thereby insuring dynamic balance of the mechanism at all times. Knife edges 68 are adapted to cooperate with the flat bottom faces of recesses 53 and thereby act in line contact upon plate 29 for a substantial distance across the face thereof, whereby uniform distribution of pressure over a substantial area thereof is effected. Each weight 56 is further provided with recesses 69 which allow free operation thereof without interference from springs 45.

The seats formed by the bottom and outer faces or walls of recesses 53 constitute bearing recesses in which edges 68 of weight heads 52 are adapted to fulcrum.

The mass of weights 56, and the number of weights and lever assemblies employed in a particular installation, is determined by a consideration of the required pressure that they must transmit under the desired speed conditions to urge the clutch plates into final non-slipping engagement. In the automatic drive clutch mechanism shown, three equally spaced weight assemblies are preferably employed.

When shaft 3 is stationary, or is operating at, or below a speed corresponding substantially to the idling speed of the prime mover employed to drive it, the parts assume the positions in which they are shown in Figure 1. Heads 52 of levers 51 are clamped between plates 29 and 38, under the influence of springs 44 acting against plate 38 and cap screws 39, and plate 38 is held in the position shown, against the action of springs 45 by means of a throwout mechanism that will be described hereinafter.

Extending through apertures 71 formed in plate 38, and preferably symmetrically disposed between the weight assemblies, are a plurality of bolts 72. Bolts 72 are provided with knurled portions 73, and are driven into plate 38 and serve to hold bolts 72 against rotation. Castle nuts 75 are threaded on bolts 72 and are adapted to be held in adjusted positions thereon by means of cotter pins 76. Hardened washers 77 are disposed on bolts 72 and cooperate with clutch fingers 78 to produce movement of plate 38 away from the flywheel. Fingers 78 are pivoted on roller or needle bearings 79 journalled on pins 80 secured in spaced ears 81 formed on bracket members 82. Pins 80 are preferably held in position in ears 81 by means of cotter pins 83, and brackets 82 are secured against pressed in portions 84 of cover 26 by means of rivets 85 or the like. Fingers 78 are provided with bifurcated portions 86, and the latter have curved faces 87, that cooperate with washers 77 in a manner to be presently described. Bolts 72 are also encircled by light compression springs 88 and washers 89' and the latter are urged into contact with levers 78 to hold the latter against rattling when they are not under the influence of springs 45.

Bolts 72 and nuts 75 are adapted to partially extend through apertures 89 formed in cover 26, and the apertures are preferably of a size sufficient to allow a wrench or the like to be applied to nuts 75 for clutch adjustment purposes.

Levers 78 are provided with weight or mass portions 90, which function to balance the levers and prevent them from responding to centrifugal force and tend to impart declutching movements to the clutch parts.

Movement of the inner ends of fingers 78 to the left, in Figure 1, through the intermediary of bolts 72, causes movement of plate 38 away from the flywheel against the action of springs 45. Movement of the reaction plate produces similar movement of plate 29 because the holdback assemblies hold the two plates in unitary relationship at all times. Fingers 78 are adapted to be actuated in this manner by means of a throwout assembly that will now be described.

Cooperating with curved faces 93 formed on fingers 78 is the flat face of a ball race 94, which cooperates with anti-friction balls 95 disposed between race 94 and a cooperating ball race 96. Ball races 94 and 96 are held in assembled relation with respect to each other by means of a combined retainer and reservoir defining member 97. Ball race 96 is rigidly mounted upon a sleeve 98 which is slidably mounted upon a hollow supporting member 99. The latter is preferably secured to housing 1 by means of cap screws 100 and is accurately assembled to be disposed in axial alignment with the clutch mechanism and prime mover shaft 3 when the clutch is assembled, and is designed to provide a close sliding fit with sleeve 98. Member 99 is preferably spaced substantially from, and is independent of, shaft 9. Sleeve 98 is provided with a tapped bore 102 into which a grease fitting 103 of well known construction is screwed. Bore 102 communicates with an axially extending passage 104 formed in sleeve 98 so that lubricant introduced through bore 102 provides lubrication for axial movements of sleeve 98 and also provides lubrication for the bearing assembly through a passage 105 communicating with passage 104 and reservoir defining member 97 associated with the bearing assembly.

Sleeve 98 is prevented from rotating about support 99 by means of an apertured lug 106 formed on sleeve 98. A stud 107 is slidably received in lug 106 and is threaded into an aperture in support 99. Formed on opposite sides of sleeve 98 are lugs 108 which cooperate with throwout fingers 109 rigidly carried by a throwout shaft 110. Shaft 110 is preferably journalled in, and extends outwardly of clutch housing 1 and carries on the end thereof a clutch pedal (not shown) which is secured against rotation thereon.

Although I have disclosed a specific throwout assembly in connection with my invention, it is to be understood that any suitable throwout mechanism having a face that is substantially normal to the clutch axis for cooperating with the inner ends of fingers 78 may be employed if desired, and a thoroughly practical mechanism obtained.

With reference to the automatic and reaction plates, it is observed that they are "keyed" together, or connected together for synchronous rotation by means of the holdback assemblies, and reaction plate 38 is in fact carried by automatic plate 29. Weights 56 are also carried by the automatic plate, and as this weight and plate organization is of comparatively great mass, movement thereof radially, or in any direction other than parallel to the axis of the mechanism, results in static as well as dynamic unbalance thereof, and as a matter of fact, it has been found in practice that for the clutch mechanism illustrated, a radial or sidewise movement of four one-thousandths of an inch of these elements represents approximately two inch-ounces tending to unbalance the mechanism.

In order for the plate and weight assembly to function properly, it must be capable of undergoing free axial movement. By designing driving lugs 36 and recesses 37 so as to provide sufficient play to permit this action, sufficient lost motion is usually introduced into the plate organization to permit it to undergo a slight radial movement, and this results in the unbalanced condition just described.

In order to eliminate this difficulty, the plate and weight organization is so designed, that it is in substantial or complete static and dynamic balance when the automatic plate is located on one side of the mechanism, i. e., with the walls of recesses 37 in close contact with two of the driving lugs 36, and means are provided for maintaining the assembly in this condition during all phases of operation of the mechanism, with the result that it is balanced at all times. The specific form of means for producing this result may take any form desired, but in the present embodiment of my invention, it consists of a bowed leaf spring 111, having an aperture 112, which fits over and is held in place by one of the driving lugs 36. In view of the simple design of the present clutch mechanism, the parts thereof may be manufactured by low-cost, quantity production methods, and yet provide plate and weight organizations whose mass is fairly symmetrically distributed. However, I prefer to compensate for unbalance of the parts by mechanism located externally of the clutch, in the manner to be hereinafter described, so that it may be balanced after it has been assembled.

In view of the fact that spring 111 exerts a frictional resistance against only one side of plate 29, engaging and disengaging movements of the latter axially of the mechanism are yieldingly resisted or retarded to some extent, which may result in the automatic plate tilting slightly as it undergoes movement into and out of engagement with facing 35. This is an advantage rather than a disadvantage, however, because the slight tilting action which takes place is not sufficient to unbalance the mechanism, especially at the comparatively low speed at which engagement occurs, and the resulting initial partial and progressive engagement of automatic plate 29 with facing 35, as weights 56 rock outwardly, imparts extremely smooth operating characteristics to the mechanism and gives a "cushion disc" effect. When the clutch is fully engaged, the plates are not tilted, but are disposed parallel to each other and normal to the axis of the mechanism, so that the mechanism does not vibrate, even at high speeds.

In the particular clutch mechanism illustrated, spring 111 preferably exerts a force of approximately thirty pounds, and is designed to urge the automatic plate toward the other lug assemblies and serves to take up the "play" or lost motion therein. Spring 111 acts against and applies pressure to portions 113 of plate 29, located either side of recesses 37.

Spring 111 accordingly maintains the parts in balanced condition at all times, and yet, in view of its resilient nature, it does not interfere with free axial and slight tilting movements of automatic plate 29. Although I prefer to employ a spring of the type disclosed for holding the parts in balanced condition, it is to be understood that a tension or compression spring, or any other suitable means, may be employed to produce this result, without departing from the spirit of the present invention.

In order to provide dynamic and static balance of the mechanism as a whole, I provide balance assemblies which are preferably secured to the outer cylindrical portion of cover 26, and they are preferably symmetrically located between the weight assemblies or radially outwardly beyond levers 78. Each balance assembly preferably consists of a pair of main or principal weight members 115, which take the form of washers; and a plurality of auxiliary weight members 116 which consist of small washers in the present embodiment of the invention; which are held in place by means of a bolt 117, passing through an aperture in cover 26, a nut 118 and a lock washer 119.

The mass of the balance assemblies depends upon the nature of the particular clutch mechanism and the dimensions and mass of the parts thereof. In the particular clutch illustrated, three symmetrically arranged balance assemblies of the size shown are employed and their mass is such as to offset the concentrated mass represented by the weight assemblies and render the mechanism both statically and dynamically balanced. In the event that after the balance assemblies are applied to the mechanism, the latter is still out of either static or dynamic balance or both, because of unsymmetrical mass distribution caused by manufacture of the parts by low-cost, quantity production methods, one or more washers 119 may be removed from or added to one or more of the balance assemblies to bring about proper balance of the mechanism.

The provision of the present balance mechanism materially reduces the cost of producing clutch mechanisms of the manual or automatic type because their parts may be cheaply made without regard to their mass or dimensions, and if, upon assembling the mechanism, it is found that it is out of balance, either statically or dynamically, it can be readily brought into balance in the manner just described.

It is also to be understood that the use of the balance mechanism just described, as well as the balance spring employed to yieldingly position the automatic plate, is not limited to the particular type of automatic clutch illustrated, and that they may, in fact, be employed for balancing manually operable clutch mechanisms.

Clutch pedal shaft 110 is preferably adustably held by a suitable mechanism in such a position that the throwout bearing assembly will hold the parts in the positions in which they are shown in Figure 1 when driving shaft 3 is stationary or is operating at, or below, a predetermined idling speed of the prime mover utilized therewith. Under these conditions, a clearance exists between the plates and there is accordingly no driving connection between shafts 3 and 9. Any suitable latch mechanism may be associated with shaft 110 or the clutch pedal for holding shaft 110 in this position, but I preferably employ the type of clutch pedal latch mechanism disclosed in my copending application, Serial No. 660,179, filed March 9, 1933, and which may be referred to for a full disclosure thereof. The throwout bearing assembly is shown in Figure 1 in what is termed its "automatic" position, and is so termed because it is preferably disposed in this position when the clutch mechanism functions, or is being employed as an automatic or speed responsive clutch. If desired however, vacuum operated mechanisms of the type shown in my copending application, Serial No. 669,766 filed May 6, 1933, may be associated with the throwout assembly for automatically actuating it, and the appended claims are intended to embrace my clutch mechanism when so equipped.

The clutch pedal may be depressed to move the throwout bearing assembly to the left of the position shown in Figure 1, for manually declutching the mechanism in a manner to be hereinafter pointed out, and the parts of the latch mechanism are so designed to allow this movement of the pedal without interference.

The latch mechanism may be operated to allow the clutch pedal to retract and permit the throwout bearing to move to the right of the position illustrated in Figure 1, into what is termed its manually engaged position.

With the throwout mechanism disposed in automatic position, the speed responsive or automatic operation of the mechanism is as follows:

*Automatic operation*

Acceleration of shaft 3 slightly above the idling speed of the prime mover does not cause actuation of the plates because springs 44 hold them in check. As driving shaft 3, and flywheel 4 are accelerated to a speed substantially in excess of idling speed, weights 56 gradually swing or rock outwardly about their knife-edges 68 as axes in response to centrifugal force. As this occurs, reaction faces 66 of heads 52 fulcrum and slide on the face of plate 38 and knife edges 68, and by virtue of their engagement and fulcrumming action upon the flat bottom surfaces of recesses 53 located in automatic plate 29, they force the automatic plate away from reaction plate 38 against the action of holdback springs 44, and into engagement with facing 35 of disk 33, on a three-point support, thus causing disk 33 to move axially and bring the facing 34 thereof into contact with intermediate plate 17, which is then moved axially against the action of retractor springs 24, and clamps driven member 14 between it and the flywheel.

Movement of automatic plate 29 away from reaction member 38 is opposed by holdback springs 44, and therefore weights 56 are held under control. Holdback springs 44, therefore, in addition to predetermining the speed of the mechanism at which automatic engaging operation is initiated, exert a steadying influence upon the clutch parts.

After the driven members are thus frictionally clamped or gripped between automatic plate 29, the intermediate plate and flywheel 4, movement of plate 29 is substantially arrested, and further rocking movement of weights 56, in response to a further increase in centrifugal force, causes faces 66 of heads 52 to force reaction plate 38 away from the flywheel against the action of springs 45. Movement of plate 38 in this manner causes pressure to slowly build up in springs 45, and a corresponding pressure is built up between the edges 68 of heads 52, and the bottoms of the recesses in automatic plate 29. This action causes the plate pressure to build up comparatively slowly, with the result that the clutch smoothly picks up the load.

It is observed that fulcrums 68 of weight heads 52 are disposed approximately midway of the outer and inner peripheries of plates 17 and 29, and act in line contact therewith for a substantial distance across their faces, applying substantially uniformly distributed pressures opposite the center of their engaging or working areas, thereby minimizing warping and distorting tendencies of the plates under the pressures and temperatures to which they are subjected during operation.

The partial vacuum established by rotation of the parts causes an air stream to be drawn through the relatively large annular passage between cover 26 and the throwout bearing and along the clutch axis. A part of the axial air stream passes over both faces of plate 38 and between plates 38 and 29, and in this connection, it should be observed that plates 29 and 38 are substantially thermally isolated, and the air currents passing between them effectively prevent the heat that is generated in plate 29, as the result of slipping, from being transmitted to plate 38, and possibly drawing or harmfully modifying the temper of springs 44 and 45 associated with the latter. Another portion of the air stream passes outwardly between plate 29 and facing 35 when they are disengaged, and the heated, dust-laden air is exhausted from the mechanism through the space between the flywheel and cover 26. Portions of the axially moving air stream enter openings formed in discs 14 and 33, (not shown), and are discharged radially between the driven members and the intermediate plate and fly-wheel, and are exhausted from the cover through openings 120 formed in flywheel rim 21, and between cover 26 and the flywheel.

The ventilating and dust-removing air may be introduced into, and exhausted from housing 1 in any desired manner, but I preferably contemplate the use of the organizations disclosed in application Serial No. 606,238, filed April 19, 1932, which have proved to be extremely efficient in practice.

When shaft 3 and flywheel 4 attain a predetermined speed, weights 56 rock out into contact with arcuately shaped stop faces 121 formed on pressed flange portions 122 of plate 38, as seen in Figure 4. In order to stop weights 56 in a definite plane that is normal to the mechanism, and thus insure dynamic balance of the device, preferably arcuately shaped stop-edges or faces 123 are accurately formed on weights 56. The stops are also designed to stop weights 56 with their centers of mass equidistant from the axis of the mechanism. When the weights have moved into their outermost positions with their stop faces 123 in contact with stop faces 121, the plates are disposed in non-slipping engagement and further acceleration of shaft 3 is ineffective to cause a further pressure to be built up between the plates. The plates are thereby held in non-slipping engagement under a predetermined pressure, and a positive friction coupling exists between shafts 3 and 9.

Stop faces 123 are so located on weights 56 that when the weights are disposed in their outward positions in contact with flange 122, the center of mass of each weight is disposed to the left of a vertical plane passing through the point of contact between stop face 121 in pressed flange 122 and stop face 123 on the weight, so that the centrifugal force developed in the weights is never effective to cause clockwise rotation of the weights about flange 122 as a fulcrum, and hence the weights are prevented from exhibiting declutching tendencies regardless of the rotational speed of the mechanism.

With reference to levers 78, they are designed so that, when the clutch is engaged, the masses thereof are so located with respect to their pivots, that the centrifugal forces set up therein, as the result of rotation of the mechanism, do not exert substantial rotative influences on the levers. When the parts are disposed in automatic idling position (Figure 1) the greater portion of the masses of levers 78, is located to the right of their pivots, but this is not a disadvantage, however, because the parts only assume these positions when the mechanism is rotating at low speeds, and the centrifugal forces existing under these conditions are likewise of low magnitude.

When the clutch has been automatically engaged in the manner just described, the inner ends of levers 78 move away from the throwout assembly, and the inner ends of the levers are spaced a substantial distance from the latter. This is brought about through movement of reaction plate 38 to the right, and the levers are held in this position under the influence of springs 86 so long as the clutch is in full, automatic engagement. Weight portions 90 are so related with levers 78, that when the clutch is automatically engaged, the centrifugal forces set up in them, each side of a plane normal to the axis of the mechanism and passing through their axes, are approximately equal, so that they will not undergo rotative tendencies. If levers 78, in response to centrifugal force, exhibited tendencies to rotate so as to move their inner ends to the left, the levers would transmit declutching forces to the reaction plate. However, if the levers should be designed so that they tended to rotate and bring their inner ends toward the throwout assembly in response to centrifugal forces set up therein, such movement would be ineffective to modify the plate pressure established by the action of weights 56, because faces 87 of levers 78 would merely move away from washers 77, against the action of springs 88. Therefore, the prime requisite is that the levers, in response to centrifugal force, will not exhibit tendencies to move in such manner as to bring their inner ends away from the throwout assembly when the clutch mechanism is automatically engaged.

In view of the resilient nature of the backing means for the reaction member, should certain weights 56 swing further outwardly than the remaining weights, during the engaging operation, the pressure exerted by them is nevertheless uniformly distributed between the segments of plate 29 for the reason that reaction plate 38 can tilt or float, and take a slight angular position with respect to automatic plate 29, due to the fact that the sole movement limiting means of the reaction member is constituted by bolts 39, and the latter are designed to provide sufficient play or clearance to permit this tilting action. The throwout bearing assembly therefore only operates when the clutch is operating at idling speeds or is manually declutched, and it therefore receives only a minimum amount of wear and its life is therefore greatly increased.

With the above described mechanism installed in a motor vehicle provided with a conventional three-speed transmission, and the vehicle on a substantially level surface, the transmission may be placed in high gear without operating the clutch pedal if the engine is operating below the engaging speed of the clutch mechanism, and the engine may be accelerated to produce automatic clutch engagement in the manner previously described. During the engaging operation, a slipping drive exists between shafts 3 and 9 and the vehicle is accelerated smoothly and without shock and in view of the speed-responsive engaging characteristics of the mechanism, it is impossible to stall the engine through improper actuation of the accelerator. When the engine and vehicle speeds are properly correlated, the clutch plates are brought into full driving engagement, thereby automatically establishing a direct coupling between shafts 3 and 9.

When operating in this manner, and it is desired to decelerate or stop the vehicle, the accelerator is released and the brakes are applied. When the vehicle has decelerated to a speed corresponding substantially to engine idling speed, through the combined braking action of the engine and the vehicle brake mechanism, weights 56 rock inwardly under the influence of hold-back springs 44, the plate assembly moves to the right (Figure 1), disengagement of the clutch plates is automatically effected, and when lugs 18 of plate 17 contact cover 26, plate 17 is arrested and disc 14 is relieved of driving pressure. Plate 29 then continues to move to the right under the influence of springs 44, until weights 56 attain neutral position, at which time driven disc 33 is relieved of driving pressure. Accordingly shafts 3 and 9 are thereby automatically uncoupled and the braking action of the engine is no longer transmitted to shaft 9, but in view of the fact that the disengaging speed of the clutch mechanism is usually fairly low, the vehicle is decelerated to a relatively low speed under the braking influence of the engine before the mechanism automatically disconnects shafts 3 and 9.

The vehicle may then be brought to a complete stop by continued application of the brakes, or, if traffic conditions permit, the accelerator may be depressed and the engine accelerated to produce almost immediate re-engagement of the mechanism and the vehicle again picked up in high gear.

Due to its slipping drive characteristics, the present mechanism constitutes a drive mechanism as well as a clutch, and while it does not multiply the torque delivered from shaft 3 to shaft 9, it permits the engine to operate at a higher speed, and consequently, at a higher point on its speed-torque curve, and deliver more power, than if substantially non-slipping conditions existed between shafts 3 and 9, and this feature, in combination with the lubricated facings, the novel plate structure, and the self-cooling characteristics of the present mechanism, renders it entirely feasible to operate vehicles in which they are incorporated in high gear under normal conditions.

As previously explained, a latch mechanism is adjusted to hold the parts in the positions shown in Figure 1 of the drawings, when the prime mover is operating at idling speed or is stationary. When the facings have become thin, as the result of particles thereof wearing away during operation, and cause the idle release plate clearance to become too great, the throwout bearing assembly is moved slightly to the right of the position in which it is shown in Figure 1, by adjusting the latch pedal on its shaft, or adjusting the latch mechanism in any suitable manner, in order to dispose intermediate plate 17 closer to the flywheel and establish proper plate clearance for idle release conditions. In co-pending application, Serial No. 595,184, filed February 25, 1932, adjusting mechanisms are disclosed that have proved to be highly successful in practice, and I contemplate using these adjusting mechanisms in the present invention. When facing wear has been compensated for several times, by periodically adjusting the throwout bearing assembly further to the right, fingers or levers 78 may be allowed to move to the right to such an extent that, under some conditions, they take undesirable angular positions. This condition is readily remedied, or compensated for, by adjusting nuts 75 an equal amount, and sufficient to bring levers 78 into the proper positions desired. The external adjusting mechanism previously referred to may then be manipulated to establish proper idle release clearance between the plates, and clearance gauges may be introduced between the cover and the flywheel and inserted between facing 15 and the flywheel face to ascertain if the plate clearance is correct. The normal plate wear compensating adjustment, however, is made externally of the clutch housing by adjusting the angular position of shaft 110 into proper automatic position, and therefore this adjustment does not in any way affect the adjusted positions of nuts 75, and consequently, the angular relation of the plates. The excess release clearance which develops between driven disc 14, the flywheel, and the intermediate plate, may be taken care of by inserting shims or the like between lugs 18 and cover 26, or by any other suitable means.

*Manual disengaging operation*

When the plates have been automatically brought into full driving engagement in the manner previously described, the clutch pedal may be depressed to displace the throwout bearing assembly and the inner ends of levers 78 to the left of the positions in which they are shown in Figure 1. Movement of levers 78 in this manner causes them to fulcrum about pins 80 and react against bolts 72 and withdraw the reaction plate from the flywheel. Withdrawal of the reaction plate produces withdrawal or disengagement of automatic plate 29 from the driven member because plates 29 and 38 are held in unitary relation by the holdback assemblies. If the engine speed is maintained above the predetermined engaging speed during the manual declutching operation, weights 56 remain in their outermost positions, therefore, the declutching operation does not involve retracting the weights against the action of centrifugal force, which, at high speeds might be sufficiently high to preclude effecting the manual declutching operation.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates (if the engine is operating above the engaging speed of the mechanism) in a manner similar to a manual clutch, for maneuvering the vehicle into and out of parking positions or for navigating in heavy traffic.

*Manual engaging operation*

As has been previously pointed out, when shaft 3 is operating substantially at the idling speed of the prime mover, or is stationary, and the clutch pedal is latched to dispose the throwout bearing in the automatic position shown in Figure 1, a clearance exists between the clutch plates, and shafts 3 and 9 are accordingly disconnected. When it is desired to establish a driving connection between shafts 3 and 9, under these conditions, the latch associated with the clutch pedal is actuated to allow the latter to move into its retracted position. Retraction of the clutch pedal allows the throwout bearing assembly to move to the right under the influence of springs 45, and the latter, acting against the reaction plate, bring reaction plate 38 and automatic plate 29 to the left of the positions in which they are shown in Figure 1, with automatic plate 29 in driving engagement with the driven member, thereby coupling shafts 3 and 9.

With the above described mechanism installed in a motor vehicle, it is frequently desirable to effect this manual engaging operation. For instance, when the motor is cold and the battery is low, it is desirable to place the transmission in gear and push or coast the vehicle to turn the engine over. Also when stopping on a steep grade, positive engagement of the clutch, with the transmission placed in low or reverse gear, provides an emergency brake that cannot be inadvertently released; or if the motor stalls, from lack of fuel or any other cause, the vehicle can pull out of dangerous positions by propelling it in low gear with the starting motor.

The present clutch mechanism is designed to be fully engaged when shaft 3 attains a speed of approximately one thousand revolutions per minute, and as the weights rock out into firm contact with their stops at this time, the only speed at which the mechanism may possibly become unbalanced is below one thousand revolutions per minute (as for instance by the weights moving outwardly unequally), but at this comparatively low speed, such unbalance, if it does exist, does not result in harmful vibration of the mechanism. Above one thousand revolutions per minute, where unbalance in the mechanism would possibly result in harmful vibration, it is maintained in accurate static and dynamic balance by means of the balancing mechanisms, and an extremely practical and effective mechanism is thereby produced.

Figure 5:
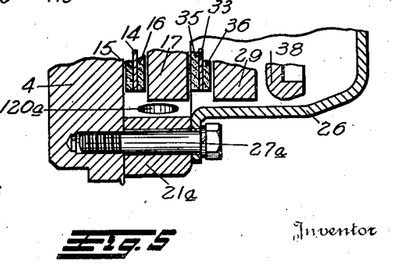
Figure 5 is a fragmental sectional view of the clutch shown in Figure 1 as it appears when provided with a modified form of clutch cover plate supporting member, also forming part of the present invention.

In Figure 5, I have illustrated a modified clutch mechanism wherein the parts are so designed that a standard flywheel may be used to produce a single or double plate clutch.

With continued reference to this figure, flywheel 4 is preferably provided with a plane face and secured thereto by cap screws 27a is cover 26 and preferably three arcuate members 21a, containing ventilating apertures 120a. Members 21a are disposed in circularly spaced relation and the adjacent ends thereof form driving faces for lugs 18 of plate 17. Members 21a accordingly take the place of the slotted flywheel rim employed in the first form of my invention.

Figure 6:
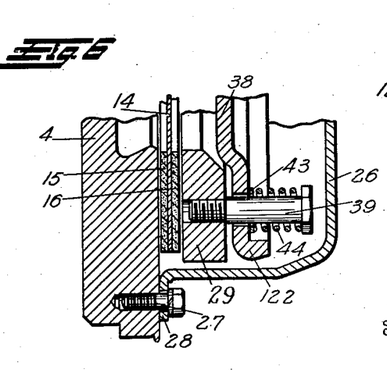
Figure 6 is a fragmental sectional view illustrating the clutch cover assembly shown in Figure 1 as being applied directly to the flywheel.

In Figure 6 the flywheel and cover unit is shown as bolted directly to the flywheel 4 and with intermediate plate 17 and driven member 33 omitted from the mechanism, thereby forming a single plate clutch. In view of the fact that the flywheel and cover assembly employed in the single and double plate clutches illustrated are identical in character, and interchangeable, it is apparent that the two clutches may be manufactured cheaply, as it is only necessary in order to produce a double plate clutch to assemble members 21a and an intermediate plate 17 with the standard flywheel and cover assembly.

Although I have disclosed individual members 21a, it is to be understood that they may be integrally formed, and be provided with slots for the accommodation of driving lugs 18, if desired, without departing from the spirit of the present invention. Moreover, as members 21a function primarily as spacing members, they may be formed and assembled in any other suitable manner other than that illustrated.

Referring now to Figure 7 of drawings, I have illustrated a modified form of mechanism for adjusting the intermediate plate. In this form of my invention, lugs 18 are adapted to cooperate with screws 131 which are threaded into cover 26 and locked in adjusted position by means of locknuts 132. The facing-wear compensating adjustment is preferably made by loosening locknuts 132 and turning screws 131 so as to bring plate 17 closer to the flywheel. When the proper idle release clearance has been established, screws 131 are locked in place by nuts 132. This adjustment has the effect of increasing the idle release clearance between plates 17 and 29, and the next step in the adjusting operation consists of actuating the external adjustment previously described so as to establish proper clearance between plates 17 and 29.

Although I have disclosed, and prefer to employ clutch mechanisms of the "double plate" type, i. e., clutch mechanisms having three driving members and two driven members, it is to be distinctly understood that my invention contemplates clutch mechanisms wherein an increased number of driving members cooperate with a correspondingly increased number of driven members to effect a driving connection between the driving and driven shafts, and the appended claims are intended to embrace clutch mechanisms of this character.

It is to be also understood that although I have described shaft 3 as the driving or power input shaft, and intend that power shall normally be transmitted from shaft 3 to shaft 9, shaft 9 may be utilized as a driving shaft, and power may be transmitted through the clutch plates to shaft 3 if desired, for instance, in automatic transmissions wherein the speed responsive mechanism is accelerated sufficiently through low-speed gearing to initiate its operation, and the appended claims are intended to embrace my novel clutch mechanisms when they are used in this manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a friction clutch mechanism, a rotatable supporting structure having a frictional member carried thereby, a unit having a frictional member and pressure applying means associated therewith, at least one frictional driven element disposed between, and being considerably thinner than said frictional members, means for securing said unit to said structure; means for spacing said unit a predetermined distance from said supporting structure; said spacing means being of a dimension sufficient to permit the mechanism to function as a single plate clutch when re-assembled with the spacing member and certain other parts omitted.

2. In a clutch, a rotatable supporting member having an axially directed cylindrical flange, a driving member having a plurality of substantially radially disposed driving lugs provided therein, said cylindrical flange being provided with a plurality of radially directed recesses extending therethrough and having open ends, said driving member being disposed with said lugs seated in said recesses and drivingly cooperating with the walls thereof, a clutch plate pressure controlling unit, provided with a cover having a radially directed flange, secured to said supporting member flange with said radially directed flange closing the open sides of said radially directed recesses, said cover being disposed in the path of movement of, and adapted to be engaged by said lugs, to thereby limit movement of said driving member away from said flywheel, and a compression spring disposed in at least one of said recesses and acting against the bottom of said recesses and reacting against one of said driving lugs and urging the latter toward said cover.

3. In a clutch mechanism, a rotatable supporting member having an axially directed cylindrical flange, a frictional driving member disposed concentrically within said flange and mounted for rotation with said supporting member, the surface of said driving member remote from said supporting member being disposed substantially in a common plane with the surface of said flange remote from said supporting member, a frictional driven member disposed between said supporting member and said driving member, and a clutch plate pressure controlling unit having a cover provided with a radially directed flange secured to said supporting member flange, said unit having a driving member mounted within said cover for rotation with said unit, and a driven member mounted within said cover adjacent said driving member, the surface of said last-named driven member remote from said last-named driving member being disposed substantially in a common plane with said radially directed flange of said cover.

4. In a friction clutch mechanism, a rotatable supporting structure having at least one frictional driving member carried thereby, a unit having at least one frictional driving member and pressure applying means associated therewith, frictional driven members interleaved between, and being considerably thinner than said frictional driving members, means for securing said unit to said structure, means for spacing said unit a predetermined distance from said supporting structure, said spacing means being of a dimension sufficient to permit the mechanism to function with fewer frictional members when reassembled with the spacing member and certain of said frictional members omitted.

5. In a clutch, a flywheel or like supporting member having an axially directed cylindrical flange; a driving member having a plurality of substantially radially disposed driving lugs provided thereon; said cylindrical flange having a plurality of radially directed open-sided recesses provided therein, said driving member being disposed with said lugs seating in said recesses and drivingly cooperating with the walls thereof, a clutch plate pressure controlling unit secured to said flange and closing the open sides of the recesses therein, said unit being so designed as to limit movement of the driving member away from said flywheel, said flange being detachably secured to said flywheel, whereby it may be removed along with said driving member and the parts re-assembled to provide a single plate clutch.

JOSEPH E. PADGETT.